(12) United States Patent
Rancourt

(10) Patent No.: US 6,328,137 B1
(45) Date of Patent: Dec. 11, 2001

(54) DISK BRAKE ASSEMBLY

(76) Inventor: Yvon Rancourt, 779 Boulevard Industriel, Blainville, Quebec (CA), J7C 3V3

( * ) Notice: Subject to any disclaimer, the term of this patent is extended or adjusted under 35 U.S.C. 154(b) by 0 days.

(21) Appl. No.: 09/266,028

(22) Filed: Mar. 11, 1999

Related U.S. Application Data

(63) Continuation-in-part of application No. PCT/CA97/01014, filed on Dec. 30, 1997.

(30) Foreign Application Priority Data

Dec. 31, 1996 (CA) .................................................. 2194206
Feb. 26, 1997 (CA) .................................................. 2198537

(51) Int. Cl.$^7$ .................................................. F16D 55/12
(52) U.S. Cl. .................. 188/18 A; 188/71.8; 188/72.3; 188/72.4; 188/196 P; 188/366; 188/367; 188/216; 188/73.31; 188/73.43; 188/264 AA
(58) Field of Search ................ 188/72.4, 72.5, 188/72.1, 71.6, 18 A, 71.4, 216, 366, 264 AA, 367, 71.5, 218 A, 370, 71.8, 196 P, 72.3, 71.9, 71.7, 73.46, 153 D, 153 R, 71.3; 192/88 A, 70.2, 70.25, 111 A, 85 AA, 70.17, 70.19; 295/7

(56) References Cited

U.S. PATENT DOCUMENTS

| | | |
|---|---|---|
| Re. 35,055 | 10/1995 | Paquet . |
| 2,256,725 * | 9/1941 | Pierce et al. . |
| 2,359,516 * | 10/1944 | Frank . |
| 2,379,972 * | 7/1945 | Lambert .................. 188/366 |
| 2,453,237 * | 11/1948 | Tourneau ................. 185/366 |
| 2,487,117 * | 11/1949 | Eaton ..................... 188/366 |
| 2,845,146 * | 7/1958 | Jones et al. ............... 188/367 |
| 2,940,572 * | 6/1960 | Warman, Jr. .............. 188/366 |
| 2,992,705 * | 7/1961 | Chisnell et al. ........... 188/366 |
| 3,072,220 * | 1/1963 | Bernson et al. . |
| 3,469,658 * | 9/1969 | Forsythe . |
| 3,830,345 * | 8/1974 | Boyles ................... 188/366 |
| 3,862,678 * | 1/1975 | Collins .................. 188/366 |
| 3,952,842 | 4/1976 | Klaue . |
| 4,026,393 * | 5/1977 | Gebhardt et al. . |
| 4,102,438 * | 7/1978 | Rancourt ................ 188/18 A |
| 4,387,901 * | 6/1983 | Ritsema . |
| 4,488,622 * | 12/1984 | Stoke . |
| 4,562,902 * | 1/1986 | Scibbe .................. 188/72.4 |
| 4,805,774 * | 2/1989 | Pringle .................. 188/366 |
| 5,076,593 * | 12/1991 | Sullivan et al. . |
| 5,330,034 | 7/1994 | Rancourt et al. . |
| 5,575,484 * | 11/1996 | Burke . |
| 5,651,430 * | 7/1997 | Rancourt et al. . |
| 5,664,655 * | 9/1997 | Oh . |
| 5,779,006 | 7/1998 | Hyde et al. . |
| 5,884,388 | 3/1999 | Patrick et al. . |
| 5,906,253 * | 5/1999 | Rancourt et al. . |
| 6,006,869 * | 12/1999 | Rancourt et al. . |
| 6,029,782 * | 2/2000 | Chojecki et al. . |

FOREIGN PATENT DOCUMENTS

| | | |
|---|---|---|
| 1163308 * | 12/1956 | (FR) . |
| 9300525 * | 1/1993 | (WO) . |
| 9829671 * | 7/1998 | (WO) . |

* cited by examiner

*Primary Examiner*—Douglas C. Butler
(74) *Attorney, Agent, or Firm*—Birch, Stewart, Kolasch & Birch, LLP

(57) ABSTRACT

An annular disk brake assembly having a housing mounted to a vehicle and a rotor disk mounted to a wheel of the vehicle. Annular brake pads extend parallel to the rotor disk within the housing and are mounted thereto with at least one brake pad being movable axially by an oil applied bladder mounted to the housing to move the first brake pad axially against the rotor disk. The rotor disk is adapted to slide axially to engage the second brake pad when pressure is applied to the rotor disk by the first brake pad and the bladder.

9 Claims, 17 Drawing Sheets

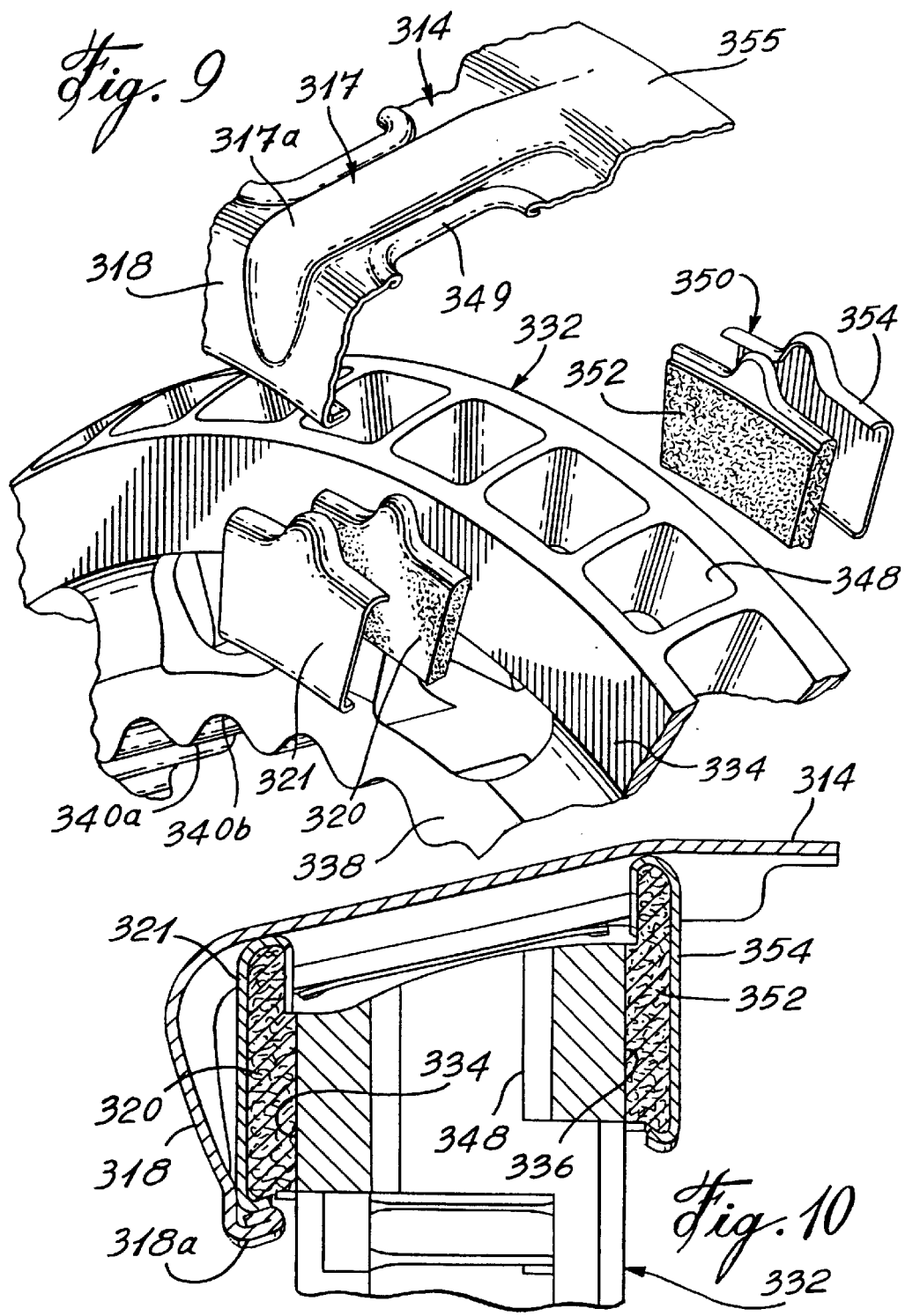

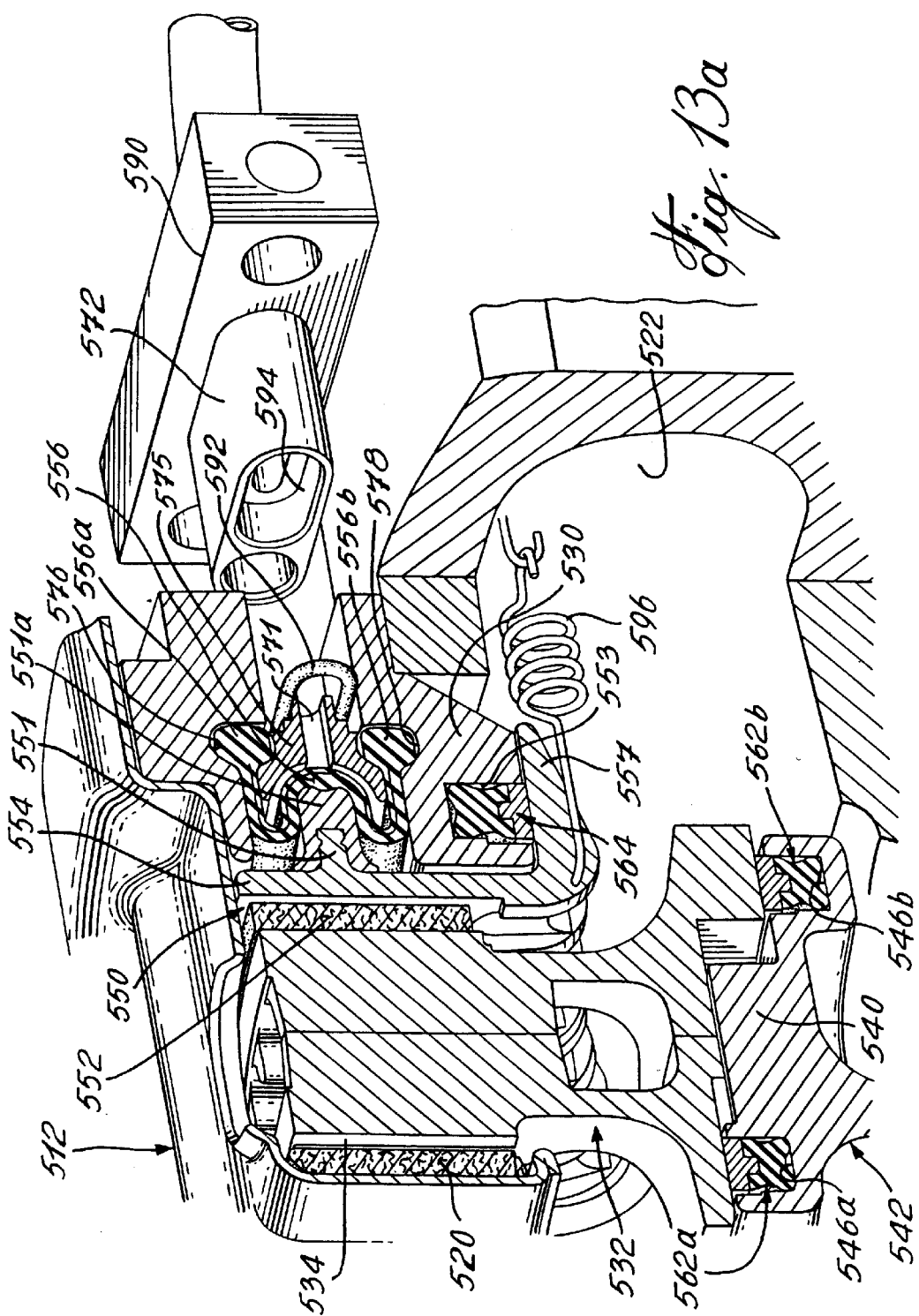

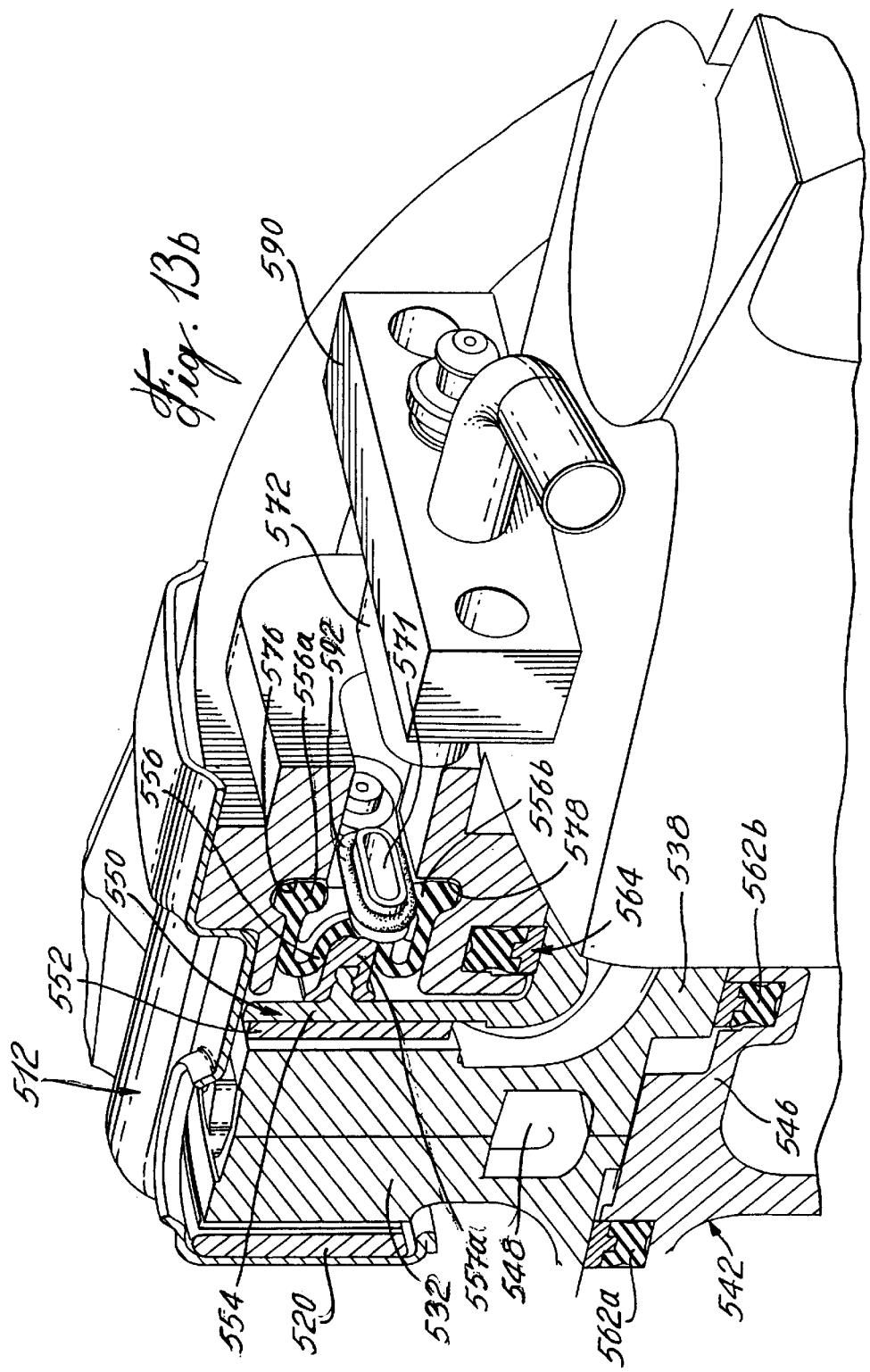

DISK BRAKE ASSEMBLY

CROSS-REFERENCE TO RELATED APPLICATIONS

The present application is a continuation-in-part application of International Application No. PCT/CA97/01014 filed on Dec. 30, 1997.

BACKGROUND OF THE INVENTION

1. Field of the Invention

The present invention relates to disk brakes and more particularly to improvements in large area contact disk brakes for vehicles.

2. Description of the Prior Art

The disk brake of the present invention is a disk brake of the type described in U.S. Pat. No. 5,330,034 issued Jul. 19, 1994 and U.S. Pat. No. Re. 35055 issued Oct. 10, 1995 referring to full annular disk brakes for larger vehicles such as trucks. The concept of the full annular disk brake is now proposed for automobiles and light trucks and the present invention relates to a structure of a full annular disk brake for such vehicles.

There are obvious advantages in having a complete annular array of friction pads contacting an annular disk on both sides of the disk. The braking or thermal energy distribution is related directly to the thermal resistance associated with both sides of the interface where the heat is generated. In a full annular brake there is a large area to distribute the braking energy more efficiently.

It has also been found that vibrations between the inner and outer pads are the major causes for brake squeal.

The analysis of vibration response is of considerable importance in the design of brakes that may be subjected to dynamic disturbances. Under certain situations, vibrations may cause large displacements and severe stresses in the brake. The velocity of a vibrating system is in general, proportional to its frequency and hence a viscous damping force increases with the frequency of vibration. Forces resisting a motion also arise from dry friction along a non-lubricated surface. It is usually assumed to be a force of constant magnitude but opposed to the direction of motion. In addition to the forces of air resistance and external friction, damping forces also arise because of imperfect elasticity or internal friction, called hysteric damping, within the body. The magnitude of such a force is independent of the frequency but is proportional to the amplitude of vibration or to the displacement.

In a brake system, dynamic loading produces stresses and strains, the magnitude and distribution of which will depend not only on the usual parameters encountered previously but also on the velocity of propagation of the strain waves through the material of which the system is composed. This latter consideration, although very important when loads are applied with high velocities, may often be neglected when the velocity of application of the load is low. Since dynamic loading is conveniently considered to be the transfer of energy from one system to another, the concept of configuration (strain energy) as an index of resistance to failure is important. One of the important concepts is that the energy-absorbing capacity of a member, that is, the resistance to failure is a function of the volume of material available, in contrast to the resistance to failure under static loading, which is a function of cross-sectional area or section modulus.

One of the main problems in adapting the technology of a full annular brake system of the type described in the above mentioned patents is the consideration of weight and cost. It would be unrealistic, no matter what the advantages, to assume that the a new full annular brake system would be accepted on the market at a price substantially higher than present day disk brakes. Furthermore any increase of weight compromises the fuel consumption.

SUMMARY OF THE INVENTION

It is an aim of the present invention to provide a brake system, especially for automobiles, that has improved heat distribution properties, and reduces the occurrence of wear.

It is a further aim of the present invention to provide a brake system that reduces low frequency brake squeal.

It is still a further aim of the present invention to provide an annular disk brake system where the maximum brake performance is obtained.

A construction in accordance with the present invention comprises a disk brake assembly for a vehicle wheel wherein the wheel includes a hub journaled to an axle on the vehicle, the disk brake assembly comprises a housing mounted to the vehicle and at least an annular rotor disk within the housing and means mounting the disk to the wheel. The rotor disk has at least a first radial planar friction surface and the housing includes a first annular brake shoe provided adjacent the first planar friction surface of the disk and movable axially towards and away from the first friction surface. Means are provided for restraining the first brake shoe from rotating with the disk. The housing also includes an annular radial wall parallel to the first brake shoe, and an annular fluid expandable bladder extends between the first annular brake shoe and the radial wall, whereby upon expansion of the bladder the first brake shoe moves axially to frictionally engage the friction surface of the disk, means for disengaging the first brake shoe from frictional contact with the rotor disk upon release of the fluid from the expandable bladder.

In a more specific embodiment of the present invention the radial disk is provided with a second annular friction surface, parallel to the first and on an opposite side of the rotor disk wherein the first and second friction disks have different radii, and a second annular brake shoe adjacent the second annular friction disk wherein brake squeal will be reduced.

In a still more specific embodiment of the present invention, the means for retaining the first brake shoe includes a brake shoe backing plate having an annular periphery and the housing includes a concentric wall having an internal surface radially adjacent the periphery of the first brake shoe while the inner surface of the concentric wall and the periphery of the first brake shoe have mating interdigital elements which allow axial movement of the first brake shoe relative to the concentric wall but prevents peripheral movement of the first brake shoe relative to the concentric wall of the housing.

In a still more specific embodiment of the present invention, the means for disengaging the first brake shoe from the first friction surface of the rotor disk is at least one rolling seal provided between axially generated adjacent surfaces of the annular radial wall of the housing and the first brake shoe.

The features of the present invention can be utilized for large trucks as well.

BRIEF DESCRIPTION OF THE DRAWINGS

The invention will now be described in detail having reference to the accompanying drawings in which:

FIG. 9 is an exploded fragmentary perspective view of yet another embodiment of the present invention;

FIG. 10 is a fragmentary enlarged radial cross-section of the embodiment shown in FIG. 9;

FIGS. 13a and 13b are fragmentary perspective exploded views taken from opposite sides of yet a further embodiment of a detail of the present invention;

DESCRIPTION OF THE PREFERRED EMBODIMENTS

Figure 1:
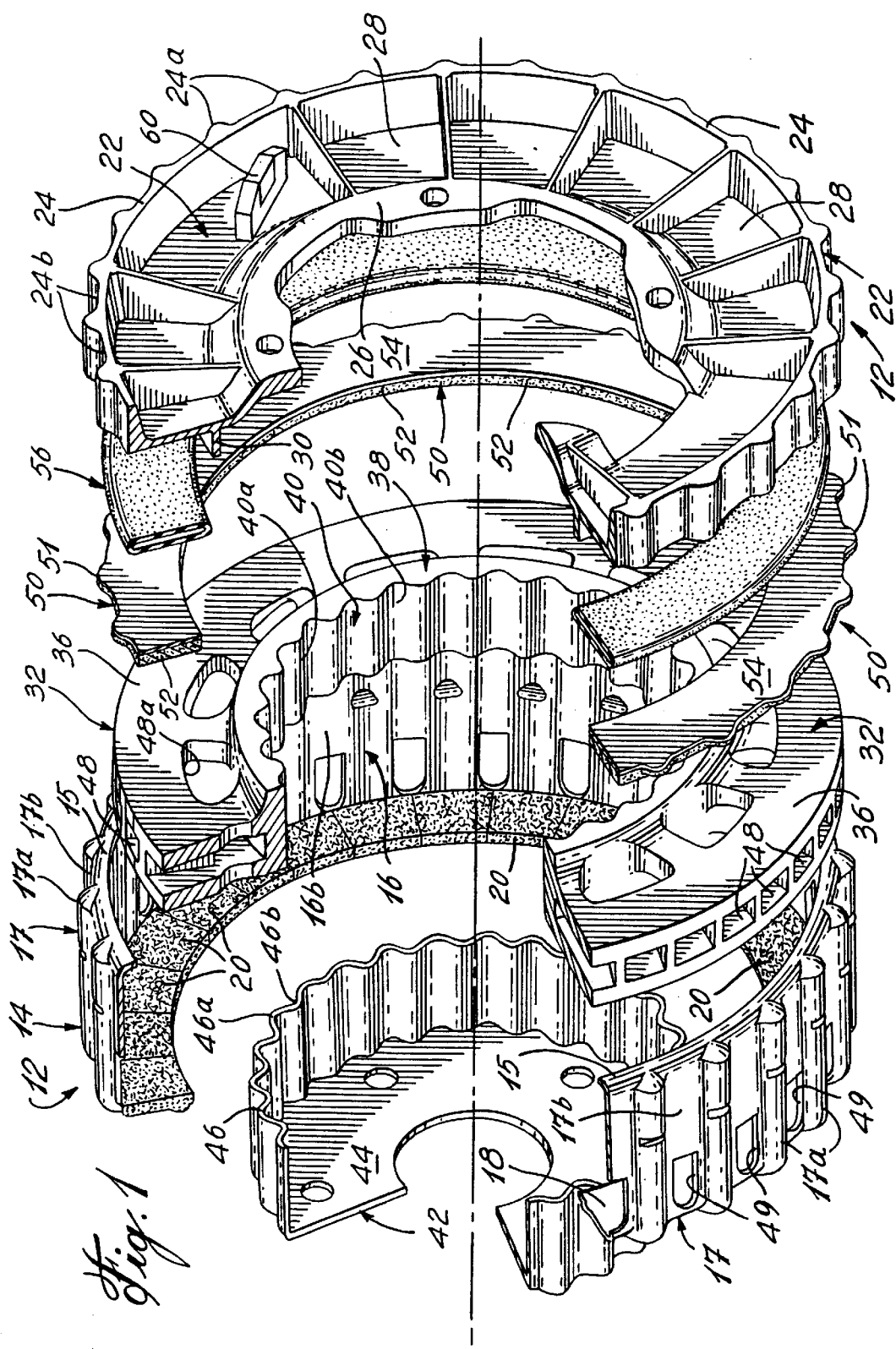
FIG. 1 is an exploded fragmentary perspective view of an embodiment of the disk brake in accordance with the present invention.

Referring now to the drawings, and more particularly to FIGS. 1 to 4b, a disk brake assembly 10 for an automobile is illustrated having a housing in the form of a shell 12. The shell 12 has a cylindrical wall 14 with a corrugated inner surface 16 having valleys 16a and ribs 16b. The housing 12 includes a radial annular wall 18 provided with an annular brake pad lining 20. The ribs 16b are relatively flat and represent valleys 17b on the outer surface 17 while ribs 17a correspond to valleys 16a.

The cylindrical wall 14 also includes a radial flange 15.

Figure 2:
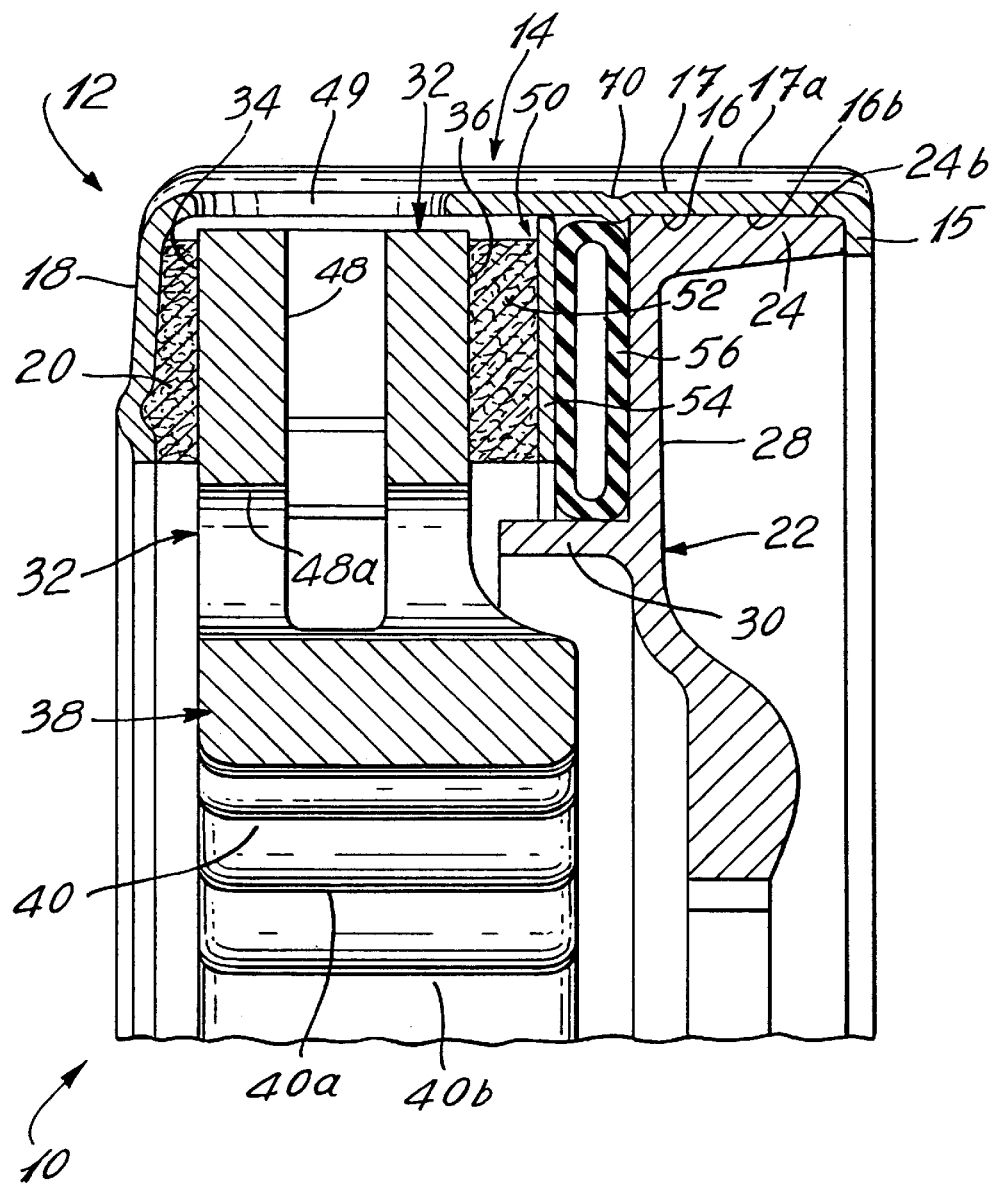
FIG. 2 is a fragmentary radial cross-section taken through the assembled disk brake.

The shell 12 also includes an annular radial wall 22 to which is mounted an annular cylindrical corrugated rim 24 adapted to fit within the corrugated inner surface 16 of the wall 14 and is retained therein by flange 15. The ribs 24a of the corrugated rim 24 fit in the valleys 16a of surface 16 while the valleys 24b correspond to the ribs 16b of the housing wall 14. Thus, the shell 12 will be locked against circumferential movements relative to the radial wall 22. The radial wall 22 has a hub portion 26 which can be bolted to a flange on an axle (not shown) of the vehicle. The radial wall 22 also includes an annular radial planar wall portion 28 and a cylindrical flange 30 as shown in FIG. 2.

An indented detent 70 (FIG. 2) is provided in the housing wall 14 in order to lock the shell 12 against axial movement relative to the radial wall 22. The detent 70 protrudes inwardly to engage the edge of rim 24.

Figure 3:
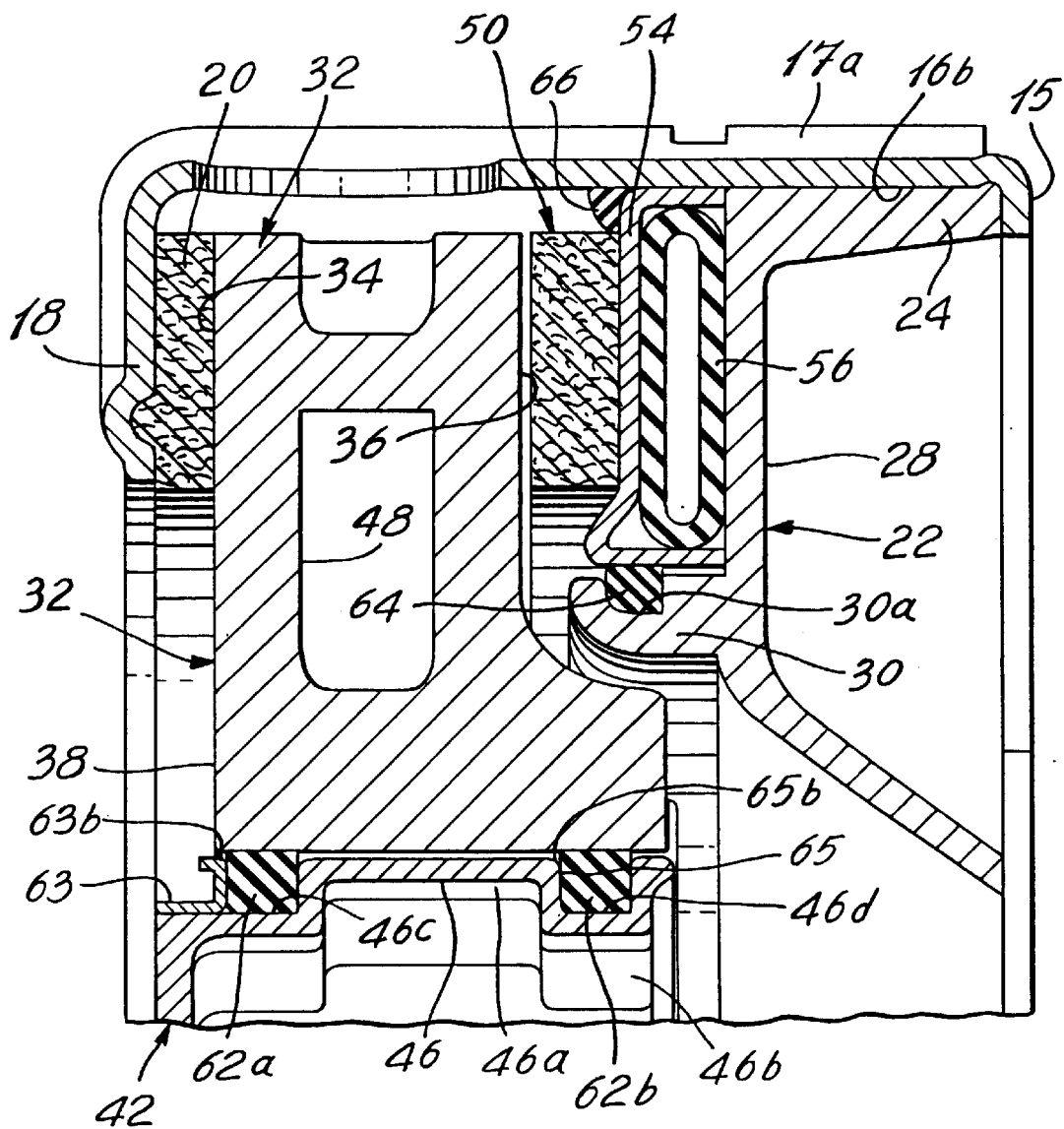
FIG. 3 is a radial cross-section similar to FIG. 2 but including further elements.
Figure 4:
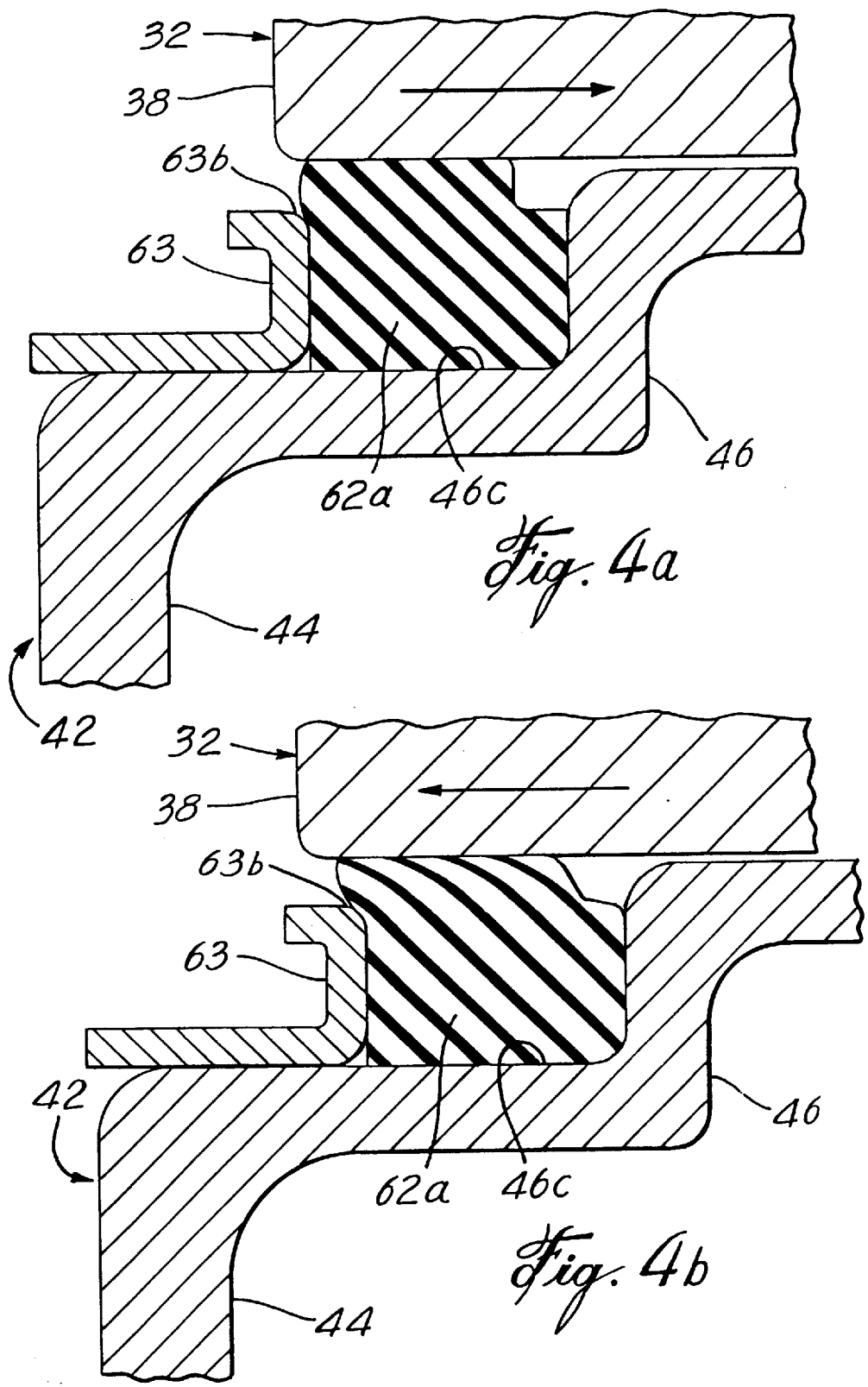
FIGS. 4a and 4b are enlarged fragmentary cross-section taken along the same section as FIG. 3 but showing the elements in a different operative position.

An annular rotor disk 32 includes radial planar friction surfaces 34 and 36 and a cylindrical annular rim 38 having an inner corrugated concentric surface 40 with ribs 40a and valleys 40b. A hub adapter 42 includes a radial wall portion 44 adapted to be mounted to a vehicle wheel (shown in the embodiment of FIG. 8) and a cylindrical corrugated wall 46. The wall 46 has ribs 46a and valleys 46b which are adapted to fit within the inner surface 40 of the rim 38 of rotor disk 32. Thus, the rotor disk 32 will be locked against rotational movement relative to the hub adapter 42 but is slidable axially thereon. Since the hub adapter 42 is mounted onto a vehicle wheel the rotor disk 32 will rotate with the wheel. The rotor disk 32 is ventilated and therefore has radially extending ventilation passages 48 communicating with openings 49 in housing wall 14. As shown in FIGS. 1, 2 and 3, there are axial opening 48a that intersect radial openings 48 so as to ensure that as much air as possible passes through the rotor disk 32.

An annular brake shoe 50 includes brake linings 52 and a backing plate 54. The brake shoe 50 includes a corrugated peripheral edge 51 engaging the inner surface 16 of the cylindrical wall 14. Thus, the brake shoe 50 can slide axially but is retained against rotational movement relative to the shell 12.

An annular inflatable bladder 56 is provided between the wall portion 28 of radial wall 22 and the backing plate 54. When fluid such as oil is fed into the inflatable bladder 56 it will expand, moving the brake shoe 50 axially towards the friction surface 36 of rotor disk 32. The rotor disk 32 will also slide axially on the hub adapter 42, in response to the force exerted by the inflatable bladder 56, and the radial friction surface 34 will come in frictional contact with the brake linings 20. Thus, when it is necessary to apply the brakes, the inflatable bladder 56 is expanded. However, to release the brakes the oil is allowed to drain from the inflatable bladder 56, thereby releasing the axial force on the brake shoe 50, allowing the disk rotor 32 to rotate freely within the shell 12. However, in one aspect of the present invention, means are provided for retracting the brake shoe 50 from the rotor 32 and likewise the rotor 32 from the brake lining 20.

These means are shown in FIGS. 3, 4a and 4b, that is the rolling seals 62, 64 which will now be described. A pair of rolling seals 62 are located, in the present embodiment, on the outer surface of corrugated wall 46 of the hub adapter 42 and are formed to the contour of the corrugated surface. Pairs of circumferentially extending grooves 46c, 46d are defined in wall 46 to receive the rolling seals 62a and 62b respectively. As shown in FIG. 3, the pair of rolling seals 62a and 62b are pre-compressed when inserted between the hub 42 and the rim 38 of the rotor disk 32. Retainer ring 63 may be provided to hold seal 62a in place. Retainer ring 63 is formed with convexly curved surface 63b to support seal 62a and control the deformation of the seal 62a as will be described. Likewise the groove wall 65 of groove 46d is also formed with convexly curved surface 65b to control the deformation of seal 62b.

When the rotor disk 32 slides on the hub adapter 42, as previously described, the rolling seals 62a and 62b will be deformed in the direction of the path of the rotor disk 32, as illustrated by the arrow in FIG. 4b, when force is exerted by the inflated inflatable bladder 56 on the brake shoe 50. When the brakes are released, the rolling seals 62a, 62b will be restored because of the energy stored therein, and will return to the shape as shown in FIG. 4a, thereby moving the rotor disk 32 and thus drawing the friction surface 34 away from the brake pad 20.

The rolling seals 62a and 62b can be selected to provide the right amount of clearance to avoid the drag which might occur when the rotor disk 32 remains in contact with the friction pad 20. It is important that only a slight clearance be provided in order to avoid undue pedal movement.

In the same manner, rolling seal 64 which is located in circumferential groove 30a on the flange 30 (FIG. 3) engages the flange of backing plate 54 on the brake shoe 50, and will act to return the brake shoe 50 away from the friction surface 36 of the rotor disk 32 when the fluid is drained from the inflated bladders 56, in order to eliminate drag of the brakes. Wiper 66 on the housing 14 seals the brake shoe from debris and dust and supplements the action of rolling seal 64.

Referring back to FIG. 1, the wall 28 is adapted to receive strain sensor 60. These strain sensors 60 may be the type known under Trademark MULTIDYN and described in U.S. Pat. No. 5,522,270 issued Jun. 4, 1996 to THOMSON-CSF. The strain sensor 60 can provide valuable information on the braking efficiencies and the wear of the brake shoes.

The strain sensor 60 extends somewhat tangentially to the wall 28 and can, therefore, monitor the torque being applied between the hub 26 and the cylindrical flange 30 of spider 22. With the information which can be obtained from strain sensor 60, the temperature of the brakes can be monitored by means of suitable micro processors. For instance, when the brakes are applied, the pressure is known, and if the heat should increase the torque will be reduced. Increased temperature of the brakes will normally signal brake deterioration or malfunction.

Other criteria can also be determined logically from the known pressure, and the torque information provided by the strain sensor 60.

Figure 5:
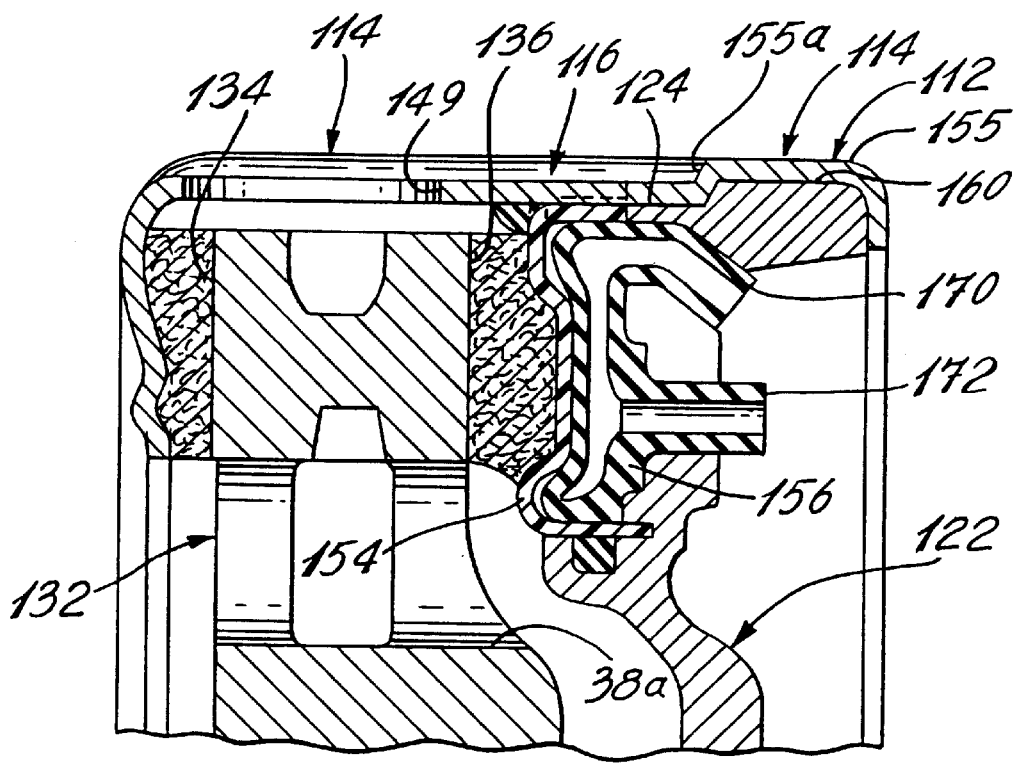
FIG. 5 is a fragmentary radial cross-section similar to FIG. 3 but showing another embodiment.

Referring now to FIG. 5 there is shown a modification to the brakes of the present invention. The elements which in FIG. 5 are similar to those in FIGS. 1 to 4 have been raised by 100.

More specifically, the housing 112 is a shell having a cylindrical wall 114 that now includes a smooth cylindrical portion 155 adjacent the corrugated portion 116. Likewise, the radial wall 122 has a smooth cylindrical wall portion 160 adjacent the corrugated peripheral wall 124. Thus, when the radial wall 122 is received within the shell or housing 112 the smooth wall portion 160 of radial wall 122 will fit in the smooth cylindrical wall portion 155 of the housing 112. A ledge 155a is formed between the corrugated wall portion 114 and the smooth wall portion 155 which acts as a stopper for the radial wall 122 having complementary peripheral surfaces, that is between the corrugated portion 124 and the smooth portion 160. This will eliminate the need for indents 70 as shown in the embodiment of FIGS. 1 to 4.

The cross-section of FIG. 5 is taken through the radial wall 122 at exactly the position where the bleed openings 170 and 172 for the bladder 156 are located.

Figure 6:
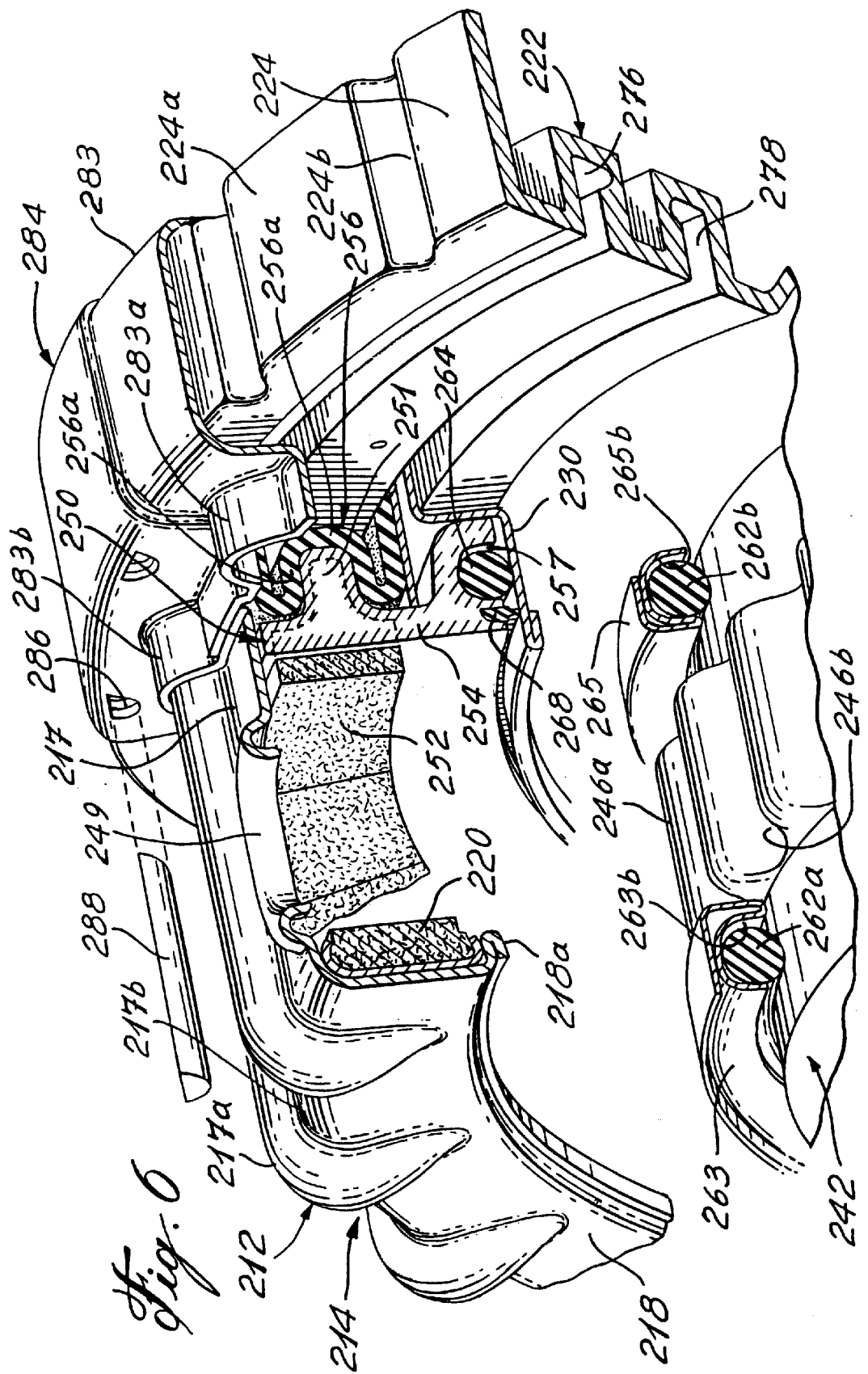
FIG. 6 is a fragmentary perspective view, partially in cross-section, of another embodiment of the present invention.
Figure 7A:
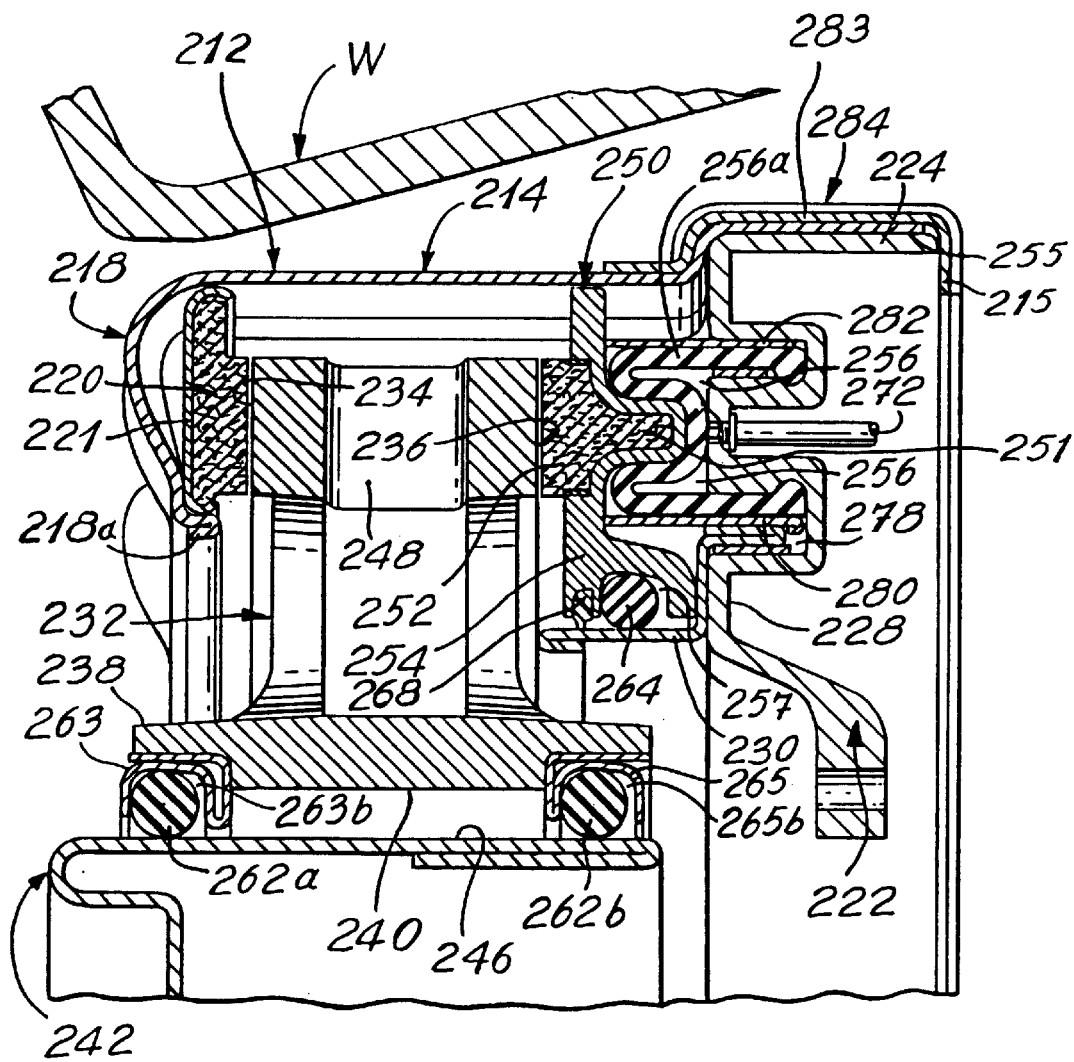
FIGS. 7a and 7b are enlarged fragmentary radial cross-sections of the embodiment of FIG. 6 showing certain elements in different operative positions.
Figure 7B:
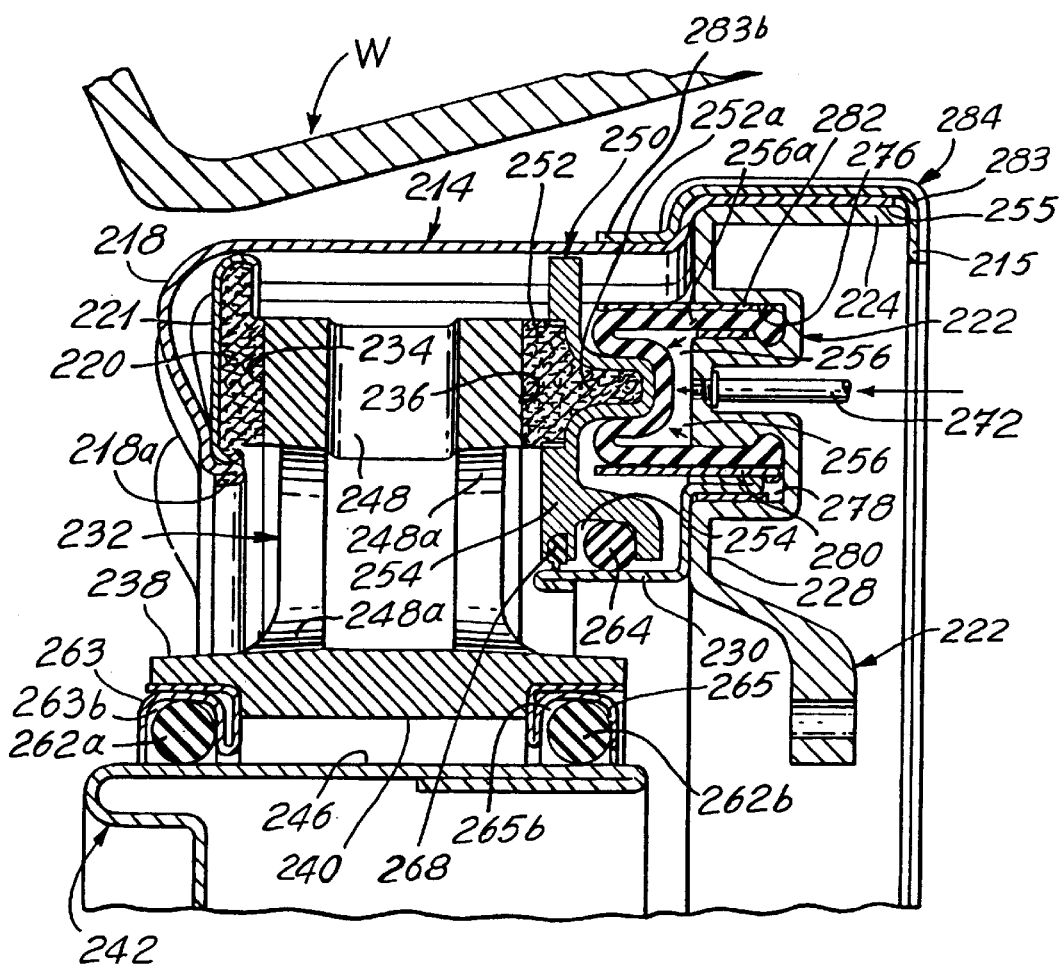
Figure 8:
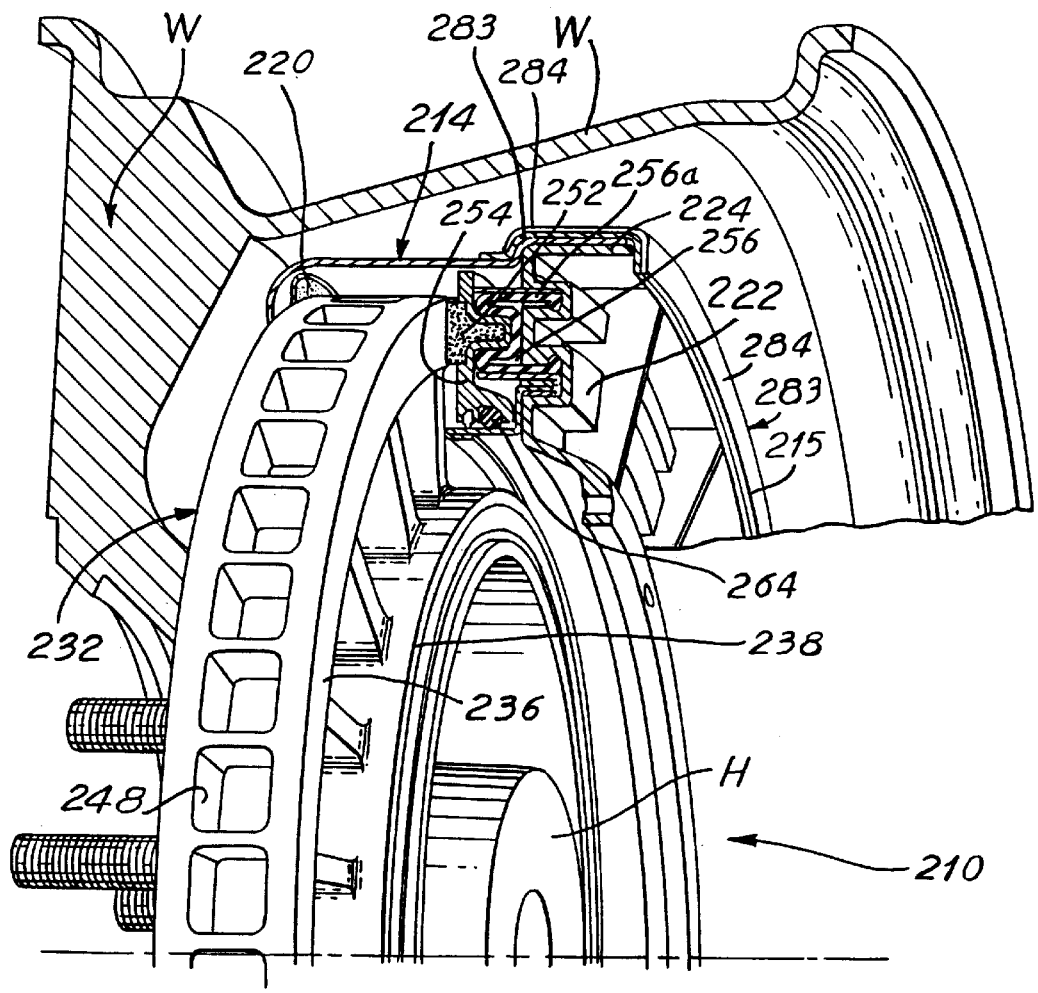
FIG. 8 is a fragmentary perspective view, partly in cross-section, of the embodiment shown in FIGS. 6 and 7.

A further embodiment of the present invention is disclosed in FIGS. 6 to 8. The reference numerals in these figures, designating elements which correspond to similar elements in the embodiment of FIGS. 1 through 4, have been raised by 200.

The disk brake 210 is shown mounted to the hub H of a wheel W (FIG. 8). Thus, the hub adapter 242 is mounted to the hub H by means of studs. The hub adaptor 242 includes a corrugated wall 246 (FIGS. 6, 7a and 7b) including ribs 246a and valleys 246b which mate with the corrugated inner surface 240 of rim 238 which is an integral part of the rotor disk 232.

FIG. 6 illustrates the various elements of this embodiment but without the rotor disk 232. The rotor disk 232 is illustrated in FIGS., 7a, 7b and 8.

As previously described, the rotor disk 232 is restrained against circumferential rotation relative to the hub adapter 242 but the rotor disk 232 can slide axially relative to the hub adapter 242. The rim 238 is notched along each edge thereof to receive rolling seal housings 263 and 265 respectively. Each rolling seal housing 263 and 265 is made of thin wall stamping and is formed as an annular channel having a lateral width which is greater than the diameter of the rolling seals 262a or 262b respectively. The area of the channel is represented by the numeral 263b and 265b in FIGS. 7a and 7b. The bight portion of the channel forms a ramp which is sloped downwardly from left to right in FIGS. 7a and 7b. Thus, when the rotor disk 232 is slid from right to left to engage the brake shoe represented by brake pad 220, the rim 238 and rolling seal housings 263 and 265 will move towards the left from the position shown in FIG. 7a to the position shown in FIG. 7b.

Observing the position of the rolling seals 262a and 262b, in FIG. 7b, one would recognize that the rolling seals are somewhat squeezed by ramps of the channels 263 and 265. Thus, the rolling seals have stored energy which can overcome the forces applied to the rotor disks 232 by the bladder 256 when the fluid is released from the bladder 256, as will be described. Thus, the rolling seals 262a and 262b will draw the rotor disk 232 away from the brake pad 220 to a position shown in FIG. 7a. The rolling seals 262a and 262b will slide on surface 246 in order to compensate for wear of the brake pad 220. The rolling seals 262a and 262b also serve as a suspension to dampen the vibrations between the rotor disk 232 and the hub adaptor 242.

In the present embodiment, the housing shell 212 represented by cylindrical wall 214 and radial wall 218 is a thin wall stamping. A skirt 218a is formed at the inner edge of the wall 218 to allow the brake pad 220 including a backing wall 221 to be snapped into position within the housing as shown in FIGS., 7a and 7b. The shell 212 may be assembled from the left end side of FIGS. 7a and 7b, with the portion 255 extending over and concentric with the cylindrical wall portion 224 of the radial wall 222. A cap 283 which may be hinged in two parts surrounds the enlarged collar portion formed by the extension 255 and has a radial skirt on each edge thereof to form a channel to lock the wall 224 of the radial wall 222 within the housing 212.

FIG. 6 shows how the two-part cap 283 with short extensions 283a and 283b overlap each other. A coupling member 284 extends over the joint so formed by the ends of the hinged cap 283. The coupling member 284 includes openings 286 through which pins 288 can pass. These pins are shaped and pass in an area coincident with the valleys in the cap 283.

The bladder 256 is shown here with a U-shaped membrane 256a having leg portions which are inserted into slots 276 and 278 within the radial wall 222. Reinforcement rings 280 and 282 are also placed in these slots to prevent the membrane 256a from expanding radially.

The brake shoe 250 including the brake pad 252 and backing plate 254, have a T-shaped configuration with the foot of the T 251 folding back the membrane 256a to form an M, as shown in FIGS. 7a and 7b. Thus, when fluid such as oil is injected through the inlet 272 as shown in FIG. 7a, the bladder 256 will expand in the axial direction as shown in FIG. 7b.

A further ring 230 (corresponding to the flange 30 in FIGS. 1 to 4) is also inserted into the groove 278 but extends axially from the radial wall 222 to support a rolling seal 264. The backing plate 254 is provided with a channel shaped groove 257 having the same construction as that described with respect to channels 263 and 265 herein. Thus, when the bladder 256 is expanded, the brake shoe 250 moves towards the left in the drawings of FIGS. 7a and 7b, applying an axial force against the rotor disk 232 by means of the brake pad 252, frictionally engaging the friction surface 236, and further pressing against the rotor disk 232 such that the friction surface 234 engages the brake pad 220. Once oil is released from the bladder 256, the rolling seal 264 which has been somewhat compressed as shown in FIG. 7b, will overcome the reduced axial force, thereby retracting the brake shoe 250 from the friction surface 236 of rotor disk 232. Simultaneously, the rolling seals 262a and 262b will retract the rotor disk 232 from frictional engagement with the brake pad 220.

A wiper 268 is shown mounted to the backing plate 254 to prevent debris from entering into the rolling seal area 264. Similar wipers (see wiper 66 in FIG. 3) can be provided at other practical locations such as between the backing plate 254 and the cylindrical housing wall 214.

A further embodiment is shown in FIGS. 9 and 10. Reference numerals corresponding to elements which correspond to elements shown in the embodiment of FIGS. 1 through 4 have been raised by 300. The rotor disk 332 has friction surfaces 234 and 236 at different radial distances from the axis of rotation of the rotor disk. As seen in FIG. 10 more clearly, the opposed friction surfaces 334 and 336 are staggered. The corresponding brake pads 320 and 352 are also constructed to correspond to the radially staggered friction surfaces 334 and 336.

The housing wall 314 is accordingly formed in order to accommodate this difference in radius. It has been found, that the amplitude and difference in amplitude of the vibration between pads such as pads 20 and 52 in the embodiment of FIGS. 1 through 4 were the major factors contributing to the generation of brake squeal. Brake squeal has been found to be a result of self induced vibration phenomena of the various parts. Under certain situations, vibrations may cause large displacements and severe stresses in the brake. The velocity of a vibrating system is, in general, proportional to its frequency and enhance a viscous stamping force increases with the frequency of vibration.

It has been found that by having the brake pads 320 and 352 as well as the corresponding annular friction surfaces 334 and 336 on the rotor disk 332 at different radii, these vibrations are at different frequencies and thus reduce the chances of harmonics which helps to reduce the brake squeal and stresses which might occur in the disk brake.

Figure 11:
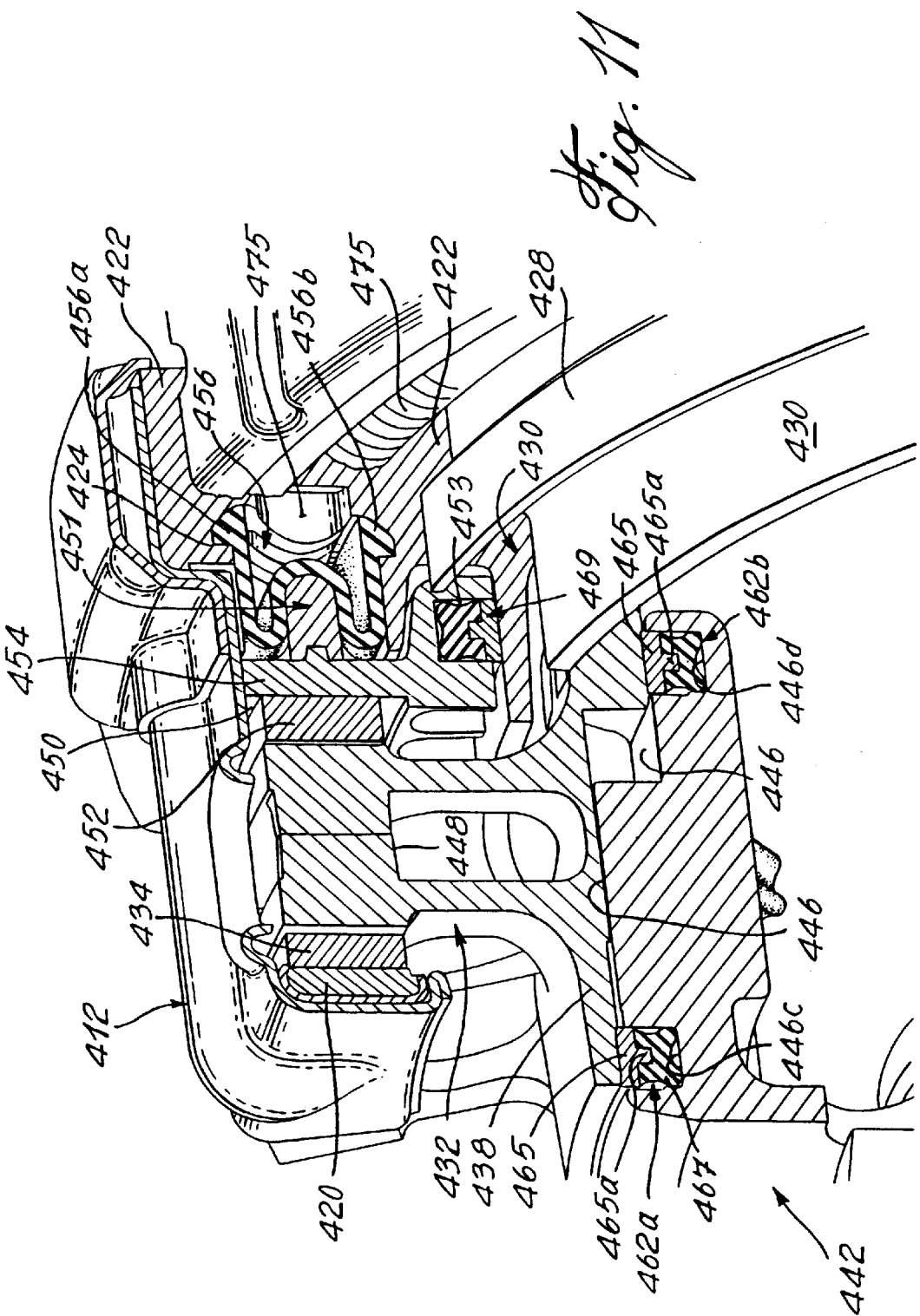
FIG. 11 is a fragmentary perspective view partly in cross-section of another embodiment of the present invention.
Figure 12:
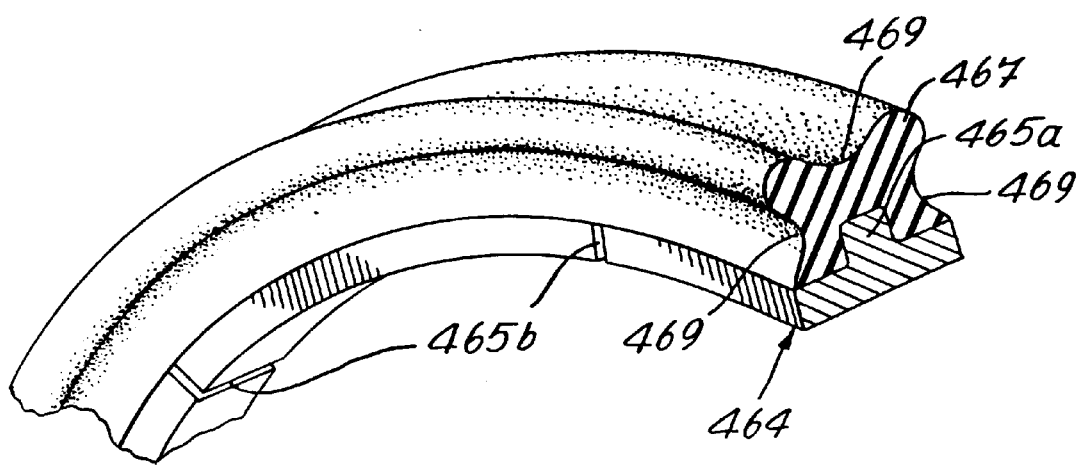
FIG. 12 is a fragmentary perspective view of a detail of the embodiment shown in FIG. 11.

Another embodiment is illustrated in FIGS. 11 and 12. In this embodiment the numerals which correspond to numerals in respect of earlier embodiments are the same but have been raised by 400.

Thus the hub adapter 442 now includes a stepped cylindrical wall 446. A pair of circumferential grooves 446c and 446d are defined in the outer surface of the cylindrical wall 446. These circumferential grooves 446c and 446d correspond to grooves 46c and 46d in the embodiment described in respect of FIG. 3.

Rolling or rocking seals 462a and 462b sit within the circumferential groove 446c and 446d, respectively. The rocking seals 462a and 462b will be described in more detail.

A brake shoe 450 mounting a brake liner 452 is mounted on the circumferential flange 430 which extends from radial wall 422. The brake shoe 450 is shaped to include a backing plate 454 for the brake liner 452 which is also provided with a lip 451 providing the reverse contour of bladder 456. The brake shoe 450 is also provided with a peripheral groove 453 adapted to receive an annular rocking seal 464 as will be described further.

The radial wall 422 is provided with a cylindrical flange 428. The radial wall 422 is also provided with a series of radial winglets or fins 475 for the purpose of absorbing and removing heat from within the bladder 456. The bladder 456 includes hook shaped ribs 456a and 456b adapted to be inserted in similar shape grooves in the respective portions of rim 424 and flange 428. The brake assembly in accordance with the embodiment shown in FIG. 11 will operate similarly to the brake assembly in previously described embodiments.

It has also been discovered that an antifreeze liquid such as Prestone (Prestone is a trademark for antifreeze of Prestone Products Corporation) could be used as a fluid for the bladder.

The rocking seals 462a, 462b and 464, shown in FIGS. 11 and 12, are an alternative to the rolling seals 62a, 62b and 64 illustrated in FIG. 3. As shown in FIG. 12 rocking seal 464 includes relatively rigid annularly aligned arcuate segments 465 each with a circumferential rib 465a. The segments 465 are attached to an elastomeric body 467 by way of adhesive. The elastomeric annular body 467, in accordance with the present embodiment, has circumferential concavities 469 on three sides of the body leaving convex ribs on the corners of the body. The rigid circumferential segments 465, of rocking seal 464, engage the horizontal surface of the flange 430.

When the brake shoe 450 moves towards the friction surface on rotor 432, the elastomeric material 467 will be slightly deformed. Once the pressure is released on the brake shoe 450, the rocking seal 464 under the influence of the resilience of the elastomeric body 467 will cause the brake shoe 450 to move slightly away from the friction surface on the rotor 432.

The rocking seals 462a and 462b are similar in construction to the rocking seal 464 but the rigid portions 465 thereof are on the outer periphery in order to engage the rim 438.

When pressure is applied to brake shoe 450 by the bladder 456 the brake shoe 450 moves towards the rotor 432. The brake shoe 450 slides laterally on the horizontal wall 446 until the friction surface 434 engages the brake pad 420. When the pressure is released on the brake shoe 454 the rocking seals 462a and 462b will act, similarly to rocking seals 464, to retract the rotor 432 from engagement with the brake pad 420.

A space 465b is illustrated between two rigid segments 465. Thus, the elastomeric body 467 exerts pressure against the rigid segments 465 to frictionally engage the surface on which the rigid segments are to be in contact with. In this case, the rigid segments 465 are in tight contact with the surface of the flange 430 as shown in FIG. 11. As discussed, in respect of the embodiments shown in FIGS. 3, 4a, and 4b, the grooves 453, in FIG. 11, has a lateral width which is greater than the lateral width of the rigid portion 465 in order to allow relative axial movement of the brake shoe 450 in this case relative to the position of the rigid segments 465.

There are several further embodiments of the so-called rocking seal and the bladder construction.

FIGS. 13a and 13b show an embodiment which is similar in construction to the embodiments shown in FIGS. 6 through 12. The reference numerals which correspond to elements in those embodiments as illustrated in the drawings, have been raised by 500. The backing plate 554 of the brake shoe 550 is provided in this embodiment with a cylindrical flange 557 and a rocking seal 564 is mounted to the flange 557 within the groove 553 formed in the cylindrical wall extension 530.

A further cylindrical flange 551 extends from the backing plate 554 to which is mounted an insulating annular member 551a which engages the inverted U of the membrane 556. The membrane 556 is provided with enlarged annular beads 556a and 556b sitting in grooves 576 and 578, respectively, of the radial wall 522. A bladder support member 575 is located in a position as shown in FIGS. 13a and 13b and defines spaced-apart fluid inlet openings 571.

In the present embodiment the inlet 571 is obround in cross-section and is adapted to receive an obround tubular extension 572 extending from the fluid plenum 590. A recess portion 594 in the tube 572 receives the seal 592 when the parts are assembled.

In addition to the rocking seal 564 a plurality of coil springs 596 are attached at one end to the cylindrical flange 557 of the backing plate 554 and at the other end to the wall 522 in order to retract the brake shoe 550 from the friction surface 536 on the rotor 540.

Figure 14A:
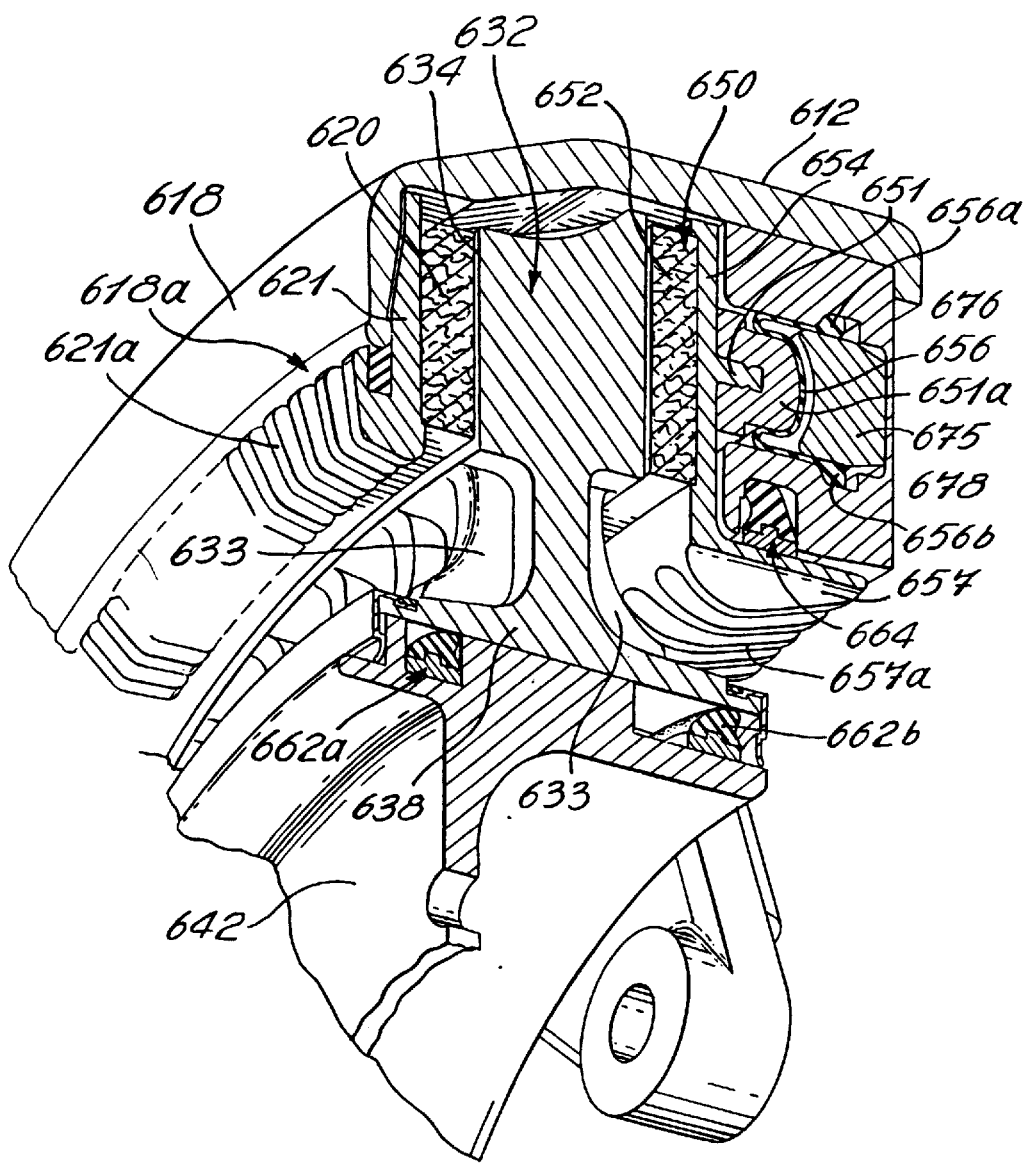
FIGS. 14a and 14b are respectively a fragmentary perspective view and an axial cross-section of a still further embodiment of a detail of the present invention.
Figure 14B:
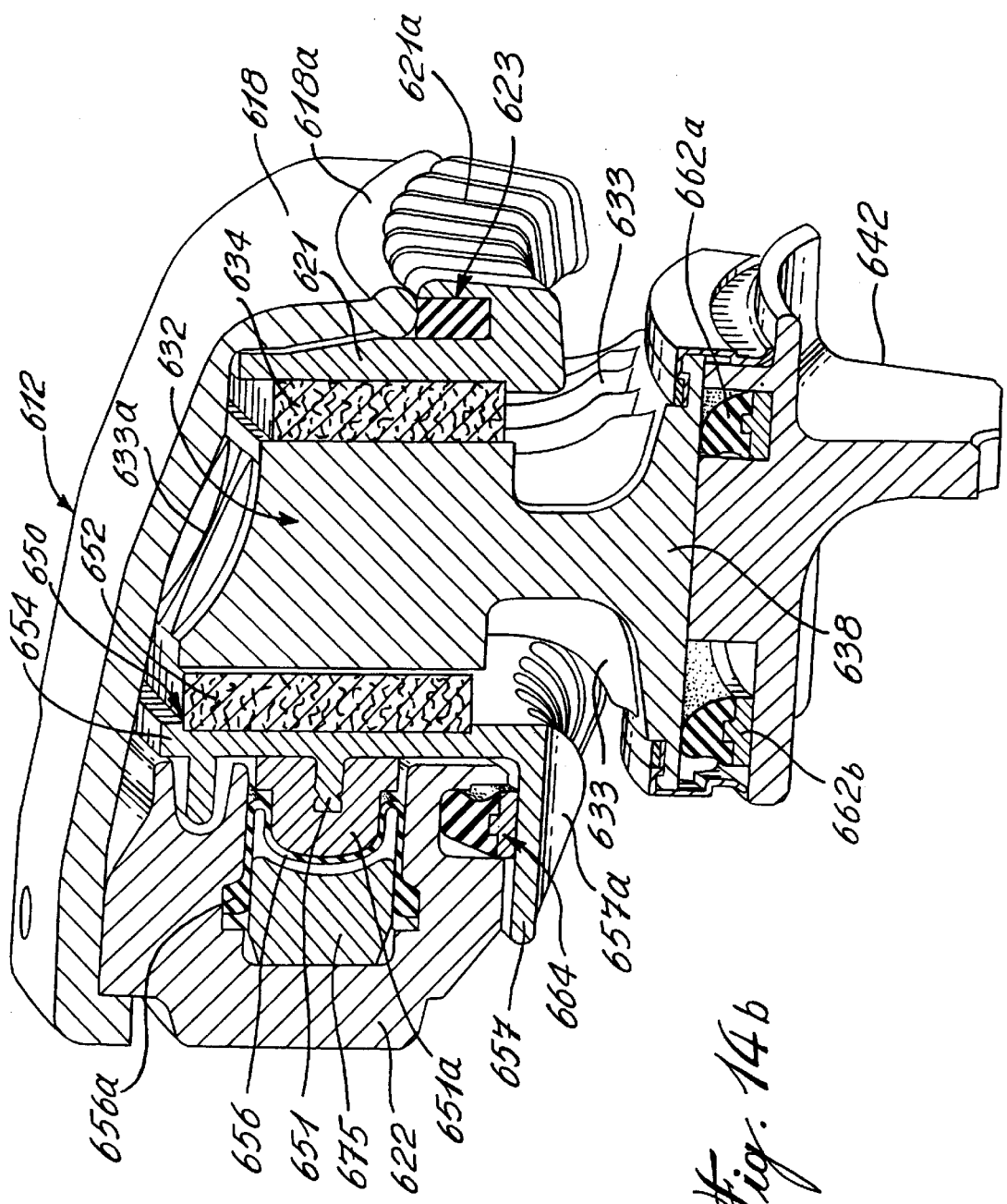
Figure 15:
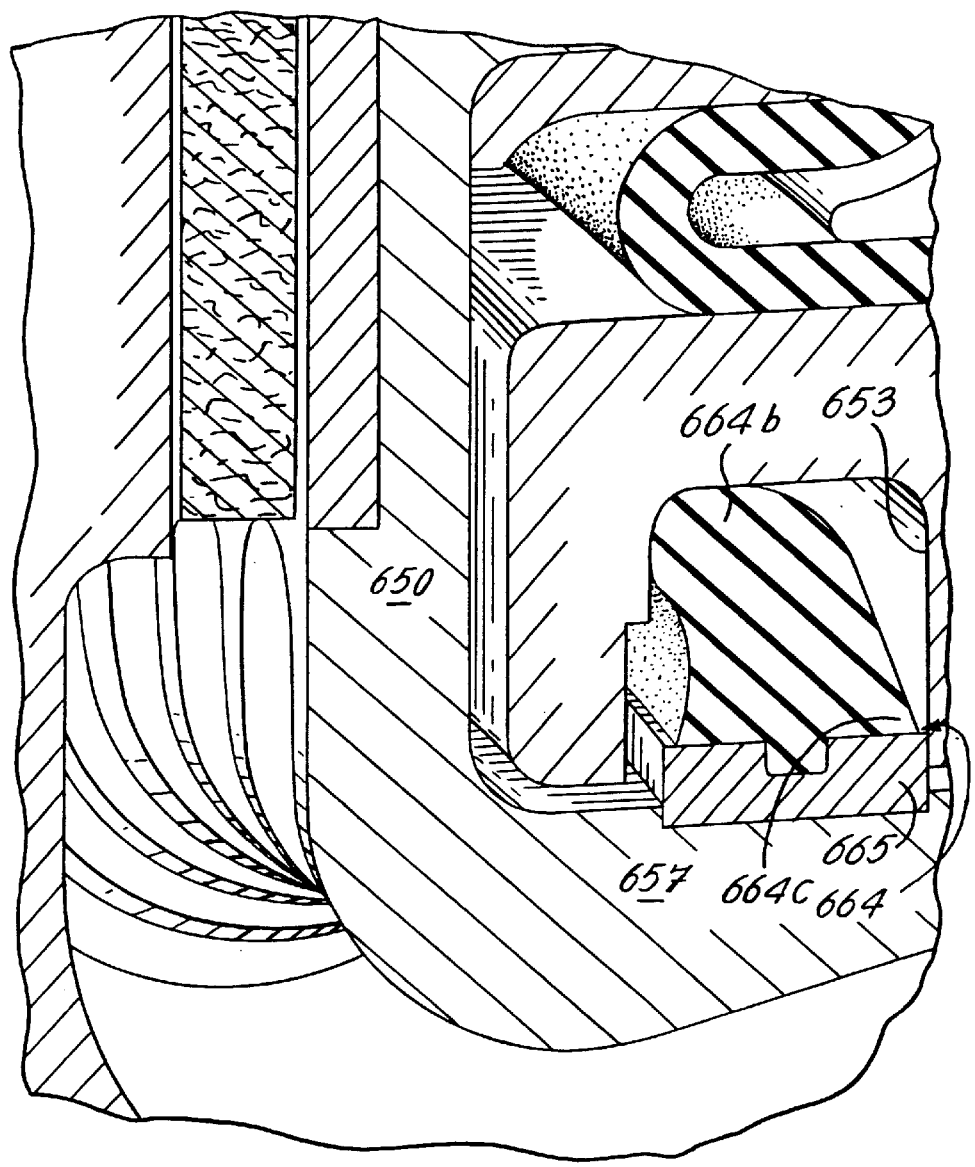
FIG. 15 is a fragmentary perspective view of a detail of the embodiment shown in FIGS. 14a and 14b.

A further embodiment is shown in FIGS. 14a to 15. The reference numerals in these figures have been raised by 600 compared to corresponding reference numerals in FIGS. 1 through 4b.

The disc rotor disk rotor 632 is shown as a solid cast annular rotor without air passages as shown in the previous embodiments. Rather the rotor is cooled by the provision of a series of heat exchange fins 636 extending in the neck formed between the periphery of the rotor and the rim 638.

Likewise, the flange 657 of the backing plate 654 and the backing plate 621 are provided with cooling fins 657a and 621a respectively.

Also shown in this embodiment is the enhanced construction of the annular skirt 618 extending from the housing 612. The skirt is formed with a reinforced bead centrally of the backing plate 621 such that the bead will apply pressure in the central portion. Cooling fins 621a extends from the backing plate and an elastomeric pad 623 is seated on the backing plate 621 and engages the bead 618a of the skirt 618 in order to reduce vibrations.

The rocking seal 664 is more clearly illustrated in FIG. 15.

In this embodiment, the rocking seal 664 is made of elastomeric material and is preformed to have a somewhat frusto-conical shape with the tip 664b closest to the brake shoe 650 and the remote portion of the base 664c being closest to the other side of the groove 653 but mounted on the flange 657 of the backing plate 654. Thus, when the brake shoe 650 is moved towards the rotor 632 the rocking seal 664 will be compressed within the groove 653, particularly along an axis extending between the tip 654b and the remote base portion 664c. Once the fluid is released from the bladder 656 the stored energy within the frusto-conically shaped rocking seal will be effective to retract the brake shoe from the rotor.

It goes without saying that the rocking seal 662a and 662b could be operated in a similar manner as rocking seal 664.

I claim:

1. A disk brake assembly for a vehicle wheel wherein the wheel includes a hub journaled to an axle on the vehicle, the disk brake assembly comprising a housing mounted to the vehicle and at least an annular rotor disk within the housing and means mounting the rotor disk to the wheel comprising a hub adapter adapted to be mounted for rotation with the wheel, the hub adapter including a cylindrical outer surface, the at least one annular rotor disk including a central opening defined by an inner cylindrical surface, and means to allow the at least one annular rotor disk to slide axially on the hub adapter but to restrain the at least one annular rotor disk against rotary circumferential movement relative to the hub adapter, the at least one annular rotor disk having at least a first annular friction surface and the housing including a first annular brake shoe provided adjacent the first annular friction surface of the at least one annular rotor disk and the first annular brake shoe being movable axially towards and away from the first friction surface, means provided for restraining the first annular brake shoe from rotating with the at least one annular rotor disk, the housing further includes an extension depending from the concentric wall located on the opposite side of the at least one annular rotor disk from the first brake shoe, and a second brake shoe is provided on the extension facing a second friction surface on the at least one annular rotor disk, the housing including an annular wall parallel to the first brake shoe, and an annular fluid expandable bladder extending between the first annular brake shoe and the annular wall, whereby upon expansion of the bladder the first brake shoe moves axially to frictionally engage the first friction surface of the at least one annular rotor disk and to move the at least one annular rotor disk towards the second brake shoe; at least one movable energy storage member is located between the outer cylindrical surface of the hub adapter and the inner cylindrical surface of the at least one annular rotor disk and arranged such that when the at least one annular rotor disk is moved axially towards the second brake shoe under the axial force which is applied by the fluid within the expandable bladder, the movable energy storage member is deformed to store energy such that when the fluid is released from the expandable bladder, the stored energy in the movable energy storage member will be effective to disengage the second friction surface of the at least one annular rotor disk from the second brake shoe.

2. A disk brake assembly as defined in claim 1, wherein the inter-digital elements include a plurality of circumferentially spaced-apart axially extending ribs on the inner surface of the concentric wall mating with corresponding valleys on the periphery of the first brake shoe.

3. A disk brake assembly as defined in claim 1, wherein the means for disengaging the first brake shoe from the first friction surface of the rotor disk is at least one movable energy storage member provided between an axially generated surface of the brake shoe and an axially generated cylindrical surface of the first radial wall of the housing which extends parallel to and adjacent the axially generated surface of the brake shoe such that the movable member can store energy when force is being applied on the first brake shoe to frictionally engage the frictional surface of the rotor disk by means of the fluid expandable bladder and whereby the stored energy is sufficient to retract the first brake shoe from the first friction surface of the rotor disk when fluid is released from the expandable bladder.

4. A disk brake assembly as defined in claim 3, wherein the first radial wall of the housing includes a cylindrical flange extending towards the rotor disk and the first brake shoe includes a backing plate having a cylindrical portion and a movable energy storage member is mounted in a groove on one of the flange of the radial wall and the cylindrical portion of the backing plate, respectively.

5. A disk brake assembly as defined in claim 3, wherein the movable energy storage member is an elastomeric rolling seal and the first brake shoe includes a backing plate and the backing plate defines a cylindrical surface opposite the radial cylindrical surface defined by the first radial wall, and a groove is defined in the cylindrical surface of the backing plate to receive the rolling seal, the groove having a radial extent greater that the radial extent of the rolling seal, and a bight portion of the groove has an inclined wall configuration to provide compression to the rolling seal when the brake shoe moves towards the rotor disk.

6. A disk brake assembly as defined in claim 1, wherein there are two axially spaced apart movable members between the inner cylindrical surface of the rotor disk and the outer cylindrical surface of the hub adapter.

7. A disk brake assembly as defined in claim 6, wherein the movable energy storage members are provided in channels formed in one of the outer and inner cylindrical surfaces of the hub adapter and rotor disk, respectively.

8. A disk brake assembly as defined in claim 1, wherein the movable energy storage member comprises an elastomeric rolling seal and the at least one annular rotor disk includes a rim which defines the inner cylindrical surface and a pair of axially spaced apart grooves are provided in the rim and channels are provided in the groove on the rim to receive the rolling seals, wherein each channel includes a bight portion having a sloping surface decreasing in depth from one side of the channel to the other and the axial extent of the channel being greater than the axial extent of the rolling seal so that the rolling seal can be compressed as the rotor disk is moving towards the second break pad, and the rolling seals engage the outer cylindrical surface of the hub adapter.

9. A disk brake assembly for a vehicle wheel wherein the wheel includes a hub journaled to an axle on the vehicle, the disk brake assembly comprising a housing mounted to the vehicle and at least an annular rotor disk within the housing and means mounting the disk to the wheel, the disk having at least a first radial planar annular friction surface and the housing including a first annular brake shoe provided adjacent the first friction surface of the disk and the brake shoe being movable axially towards and away from the first friction surface, means provided for restraining the first brake shoe from rotating with the disk, the housing including an annular first wall means adjacent to the first brake shoe, and an annular fluid expandable bladder extending between the first annular brake shoe and the wall means, whereby upon expansion of the bladder the first brake shoe moves axially to frictionally engage the first friction surface of the disk, characterized in that means are provided for disengaging the first brake shoe from the first friction surface of the rotor disk comprising at least one rolling seal provided between an axially generated surface of the brake shoe and an axially generated cylindrical surface of the first wall means which extends parallel to and adjacent the axially generated surface of the brake shoe such that the rolling seal can store energy when force is being applied on the first brake shoe to frictionally engage the first frictional surface of the rotor disk by means of the fluid expandable bladder and whereby the stored energy is sufficient to retract the first brake shoe from the first friction surface of the rotor disk when fluid is released from the expandable bladder.

\* \* \* \* \*